(12) United States Patent  
Taguchi et al.

(10) Patent No.: US 7,984,791 B2  
(45) Date of Patent: Jul. 26, 2011

(54) OIL DISCHARGE STRUCTURE OF BAFFLE PLATE

(75) Inventors: Hiromi Taguchi, Fuji (JP); Hitoshi Suzuki, Fuji (JP); Katsuyoshi Nakajima, Fuji (JP)

(73) Assignee: Jatco Ltd (JP)

( * ) Notice: Subject to any disclaimer, the term of this patent is extended or adjusted under 35 U.S.C. 154(b) by 1023 days.

(21) Appl. No.: 11/223,351

(22) Filed: Sep. 9, 2005

(65) Prior Publication Data

US 2006/0048600 A1    Mar. 9, 2006

(30) Foreign Application Priority Data

Sep. 9, 2004   (JP) ................................. 2004-262856

(51) Int. Cl.  
*F16H 57/04* (2010.01)

(52) U.S. Cl. .................. 184/6.12; 184/11.1; 74/467

(58) Field of Classification Search .................. 184/6.12, 184/11.1, 11.3, 1.5; 74/467, 606 R, 607, 74/468; 475/230, 248, 159  
See application file for complete search history.

(56) References Cited

U.S. PATENT DOCUMENTS

| | | | |
|---|---|---|---|
| 2,292,086 A | | 8/1942 | Pritchard |
| 2,645,305 A | | 7/1953 | Roos |
| 3,618,711 A | * | 11/1971 | Vollmer ........................ 184/6.12 |
| 3,625,310 A | * | 12/1971 | Herrick ........................ 184/6.12 |
| 4,184,808 A | * | 1/1980 | Cobb ............................ 417/348 |
| 4,231,266 A | | 11/1980 | Nishikawa et al. |
| 4,378,711 A | * | 4/1983 | Daniel ............................ 74/467 |
| 4,414,861 A | * | 11/1983 | Witt ............................. 74/606 A |
| 4,693,133 A | * | 9/1987 | Tomita et al. .................... 74/467 |
| 4,914,968 A | * | 4/1990 | Diermeier et al. ............... 74/467 |
| 5,048,370 A | * | 9/1991 | Duello ........................ 74/606 R |
| 5,404,963 A | | 4/1995 | Crepas et al. |
| 5,505,112 A | * | 4/1996 | Gee ............................ 74/606 R |
| 5,511,448 A | * | 4/1996 | Kameda et al. ........... 74/665 GE |
| 5,522,476 A | * | 6/1996 | Holman ........................ 184/6.12 |
| 5,667,036 A | | 9/1997 | Mueller et al. |
| 5,676,221 A | | 10/1997 | Renk et al. |

(Continued)

FOREIGN PATENT DOCUMENTS

DE   3819519 A1   12/1989

(Continued)

OTHER PUBLICATIONS

Extended European search report issued for EP patent application No. 05255797.2-1254 mailed Nov. 7, 2007. 7 pages.

(Continued)

*Primary Examiner* — Bradley T King  
*Assistant Examiner* — Thomas Irvin  
(74) *Attorney, Agent, or Firm* — Rossi, Kimms & McDowell LLP

(57) ABSTRACT

An oil discharge structure of a baffle plate for discharging oil from a space of a gear side to a space of a transmission side with a space-saving design is provided. A slit is formed in a side face plate facing a final gear of a case side baffle plate to discharge the oil from an oil volume X in the circumference of the final gear to an oil volume Y stored in a clearance between the case side baffle plate and the transmission case, and in a clearance between the housing side baffle plate and the housing. This provides a compact structure that is not larger in a radial direction of the final gear and discharges the oil in the oil volume X.

4 Claims, 4 Drawing Sheets

U.S. PATENT DOCUMENTS

| | | | |
|---|---|---|---|
| 5,768,954 A | 6/1998 | Grabherr et al. | |
| 5,791,311 A | 8/1998 | Ozeki | |
| 5,910,062 A | 6/1999 | Mizuta | |
| 6,189,412 B1 | 2/2001 | Tsubata et al. | |
| 6,238,312 B1 | 5/2001 | Tsubata et al. | |
| 6,299,561 B1 * | 10/2001 | Kramer et al. | 475/160 |
| 6,616,432 B2 | 9/2003 | Szczepanski et al. | |
| 7,343,833 B2 * | 3/2008 | Matsushima | 74/607 |
| 7,421,921 B2 * | 9/2008 | Kimura et al. | 74/331 |
| 2006/0060424 A1 | 3/2006 | Tominaga et al. | |
| 2006/0065487 A1 | 3/2006 | Tominaga et al. | |

FOREIGN PATENT DOCUMENTS

| | | |
|---|---|---|
| DE | 19731746 A1 | 2/1998 |
| DE | 100 34 561 A1 | 2/2001 |
| EP | 0974775 A2 | 1/2000 |
| EP | 0985853 A2 | 3/2000 |
| EP | 0985853 A3 | 10/2002 |
| GB | 458379 A | 12/1936 |
| GB | 774221 A | 5/1957 |
| GB | 1426352 A | 2/1976 |
| GB | 2006348 A | 5/1979 |
| JP | 1-67374 U | 4/1989 |
| JP | 9-72209 A | 3/1997 |
| JP | 11-98616 A | 4/1999 |
| JP | 2001-221326 A | 8/2001 |
| JP | 2001221326 A | 8/2001 |
| JP | 2002-70993 A | 3/2002 |
| JP | 2003-156127 A | 5/2003 |

OTHER PUBLICATIONS

Extended search report issued in European application No. 05255798.0-1254, corresponding to related co-pending U.S. Appl. No. 11/231,301; dated Jan. 31, 2008.

Extended European Search Report issued in corresponding European Patent Application No. 05255507.5 dated Apr. 16, 2010.

* cited by examiner

OIL DISCHARGE STRUCTURE OF BAFFLE PLATE

BACKGROUND OF THE INVENTION

1. Field of the Invention

The present invention relates to an oil discharge structure of a baffle plate surrounding a rotating body.

2. Description of the Prior Art

As described in Japanese Utility Model Laid-open Publication No. H1-67374, there has been conventionally used a baffle plate surrounding a rotating body (referred to as "a gear" hereinafter) in an automatic transmission.

The baffle plate separates a space of a gear side from a space of a transmission case side (an oil-storing side) by surrounding a circumference of the gear placed in oil, thereby reducing an amount of the oil stirred by the gear.

An inlet/outlet hole is formed in a lower part of the baffle plate to connect the space of the gear side to the space of the transmission case side so that unnecessary oil stirred by the gear is discharged to the space of the transmission case side.

Hence, a friction loss during rotating of the gear has been reduced.

However, when the inlet/outlet hole is formed in the lower part of the baffle plate surrounding the gear, a space for oil flow in addition to a space for the inlet/outlet hole are required in a lower part of the transmission case. This prevents downsizing of the automatic transmission.

SUMMARY OF THE INVENTION

It is an object of the present invention, in view of the foregoing problems, to provide an oil discharge structure of a baffle plate, in which oil can be discharged from a space of the gear side to a space of the transmission case side with a space-saving design.

According to one aspect of the present invention, an oil discharge structure of a baffle plate includes a transmission case surrounding a rotating body in a rotating body chamber, an oil reservoir to store oil discharged from the rotating body chamber, an oil discharge path from the rotating body chamber to the oil reservoir, and a baffle plate placed between the transmission case and the rotating body in the rotating body chamber to surround a lower part of the rotating body, so that the oil in a circumference of the rotating body is divided into a rotating body side and a transmission case side in the rotating body chamber, wherein the baffle plate includes an oil discharge hole facing a side face of the rotating body, and the oil discharge hole facing an opening of the oil discharge path at a side of the rotating body chamber, which permits the oil in the rotating body side divided by the baffle plate to be discharged from the oil discharge hole to the oil discharge path.

According to the present invention, since the baffle plate surrounds the lower part of the rotating body, an amount of oil to be stirred by the rotating body is reduced, thereby allowing a reduction in a friction loss of the rotating body.

Further, since the oil discharge hole is formed in a position facing a side face of the rotating body, no space for oil flow is needed in a lower part of the transmission case. As a result, an automatic transmission in a smaller size in a radial direction of the rotating body can be provided as compared to a case where the oil discharge hole is formed in a lower part of the baffle plate.

Since the oil discharge hole and the opening of the oil discharge path are adapted to be positioned as opposed to each other, the oil in the rotating body side can be actively discharged to a side of the oil discharge path, which prevents an oil shortage in the oil reservoir from occurring.

These and other objects, features, aspects and advantages of the present invention will be become apparent to those skilled in the art from the following detailed description, which, taken in conjunction with the annexed drawings, discloses preferred embodiments of the present invention.

DETAILED DESCRIPTION OF THE PREFERRED EMBODIMENT

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Embodiments of the present invention are described below with reference to the accompanying drawings.

Figure 1:
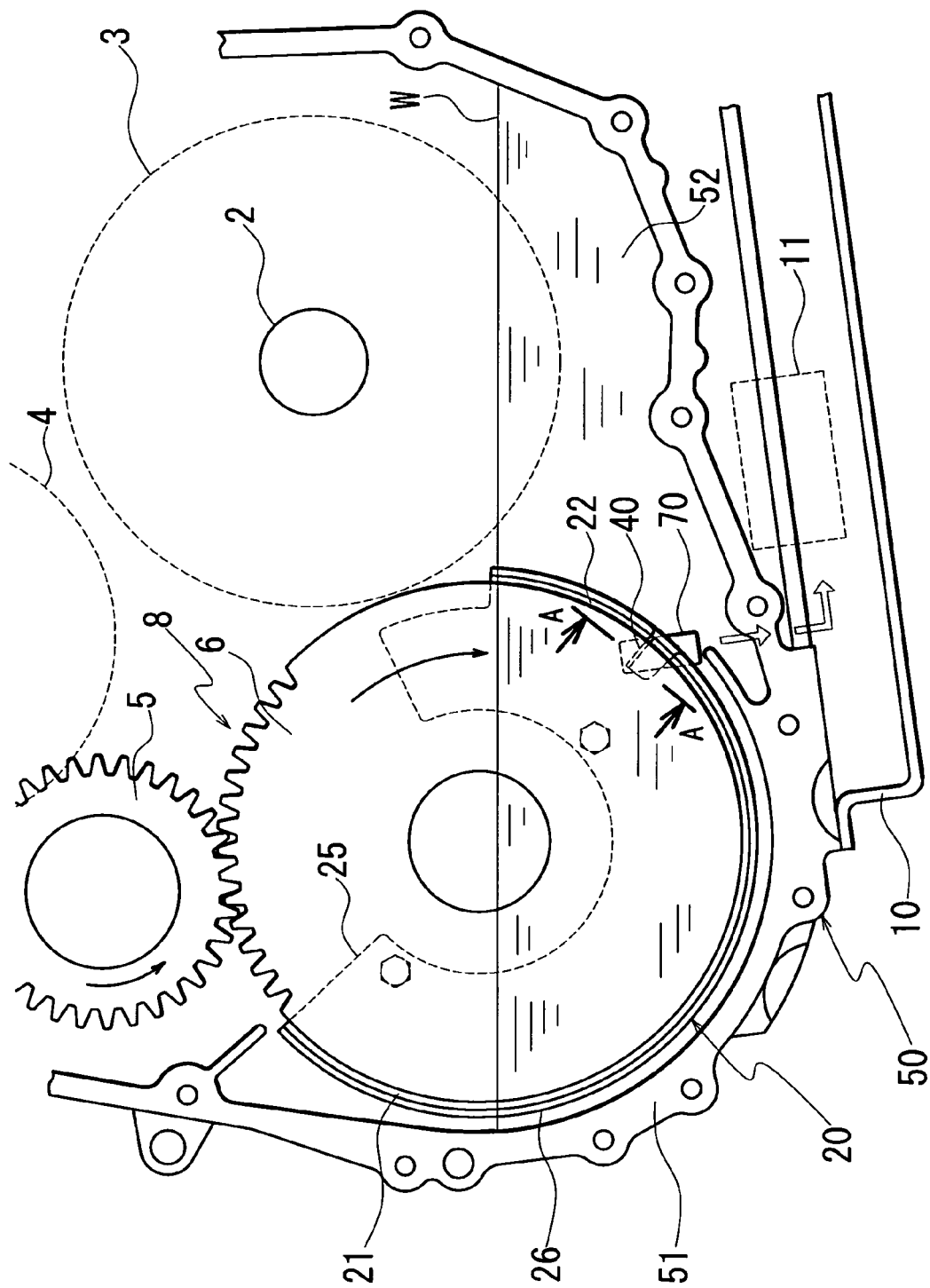
FIG. 1 is a front view showing a final gear seen from a housing side in a preferred embodiment of the present invention.
Figure 2:
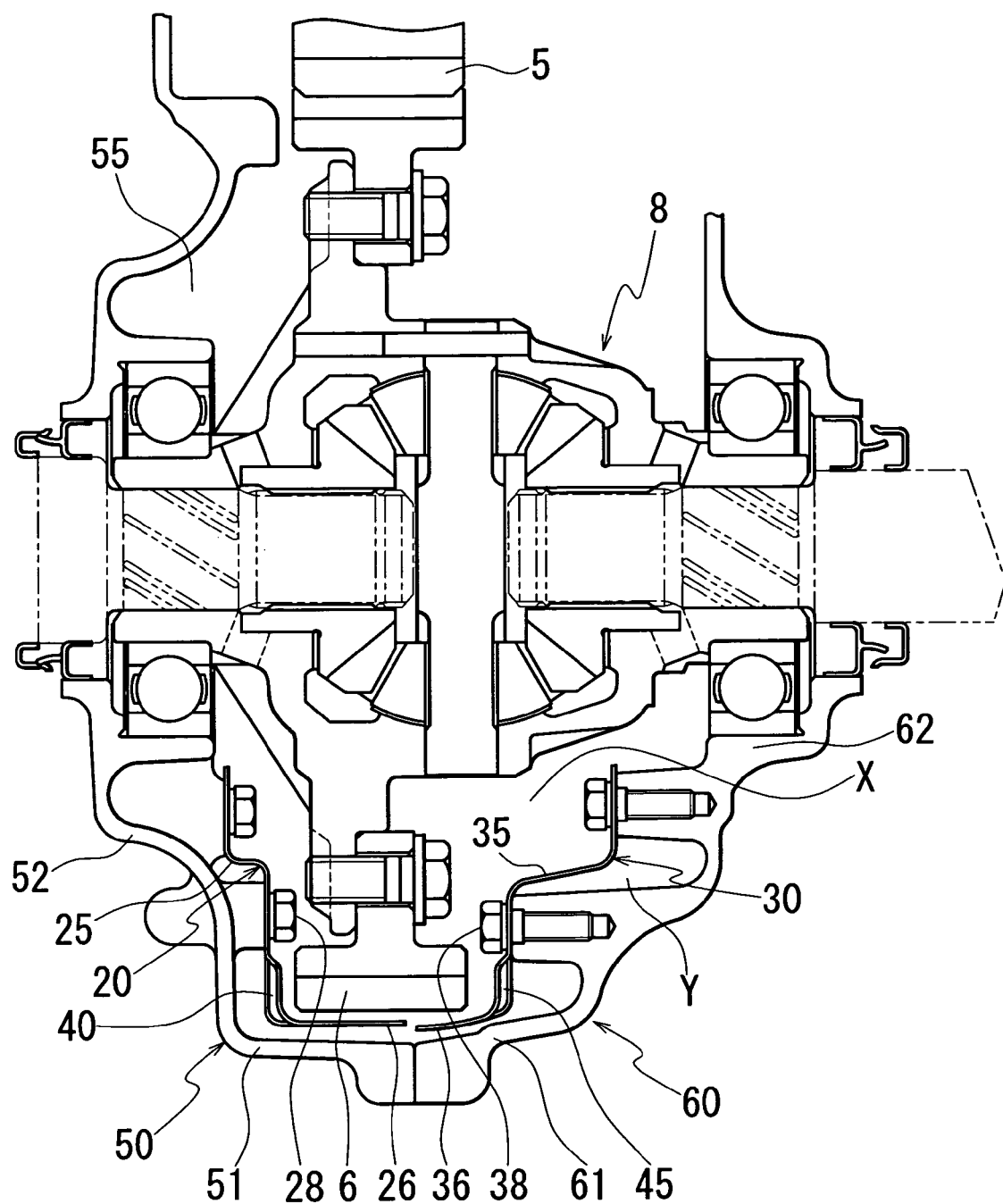
FIG. 2 is a cross-sectional view showing a differential unit in the preferred embodiment.

FIG. 1 is a front view showing a final gear of an automatic transmission seen from a housing side and FIG. 2 is a cross-sectional view showing a differential unit of the automatic transmission.

Power from an engine is transmitted to an input shaft 2 of an automatic transmission.

The power transmitted to the input shaft 2, after rotation speeds of the input shaft 2 are converted through a transmission unit including a primary pulley 3 connected to the input shaft 2, a secondary pulley 4 fixed to a secondary shaft and a V-shaped belt (not shown) wound between both the pulleys 3 and 4, transmitted to a reduction gear 5.

The reduction gear 5 engages with a final gear 6 of a differential unit 8 to transmit the power to the differential unit 8 from the reduction gear 5.

The power transmitted to the differential unit 8 is transmitted to driving wheels (not shown) of a vehicle, thus driving the vehicle.

When the vehicle runs forwards, the reduction gear 5 and the final gear 6 rotate in the direction of the arrow respectively shown in FIG. 1.

Oil is stored to an oil level "W" in a transmission case 50 and generally one half of the final gear 6 is immersed in the oil.

An oil pan 10 is mounted in a lower part of the transmission case 50.

An oil strainer 11 is placed in the lower part of the transmission case 50, through which an oil pump (not shown) sucks up the stored oil in the oil pan 10.

The transmission case 50 includes a case supporting wall 52 to support one end of each of the input shaft 2, the secondary shaft, the reduction gear 5 and the differential unit 8, and a case side connecting section 51 extending from an outer peripheral edge of the case supporting wall 52 toward the front side in FIG. 1.

The other end of each of the input shaft 2, the secondary shaft, the reduction gear 5 and the differential unit 8 is, as specifically shown in FIG. 2, supported by a housing support section 62 of a housing 60 connected to the engine.

A housing connection section 61 extends from an outer peripheral edge of the housing support section 62.

The case supporting wall 52 of the transmission case 50 is joined to the housing support section 62 of the housing 60 by a bolt (not shown) to house therein the transmission unit including the primary pulley 3 and the secondary pulley 4, the reduction gear 5, and the differential unit 8.

With this, as shown in FIG. 2, the differential unit 8 is housed in a rotating body chamber 55 surrounded and defined by the transmission case 50 and the housing 60.

A fan-shaped case side baffle plate 20 is placed at a side of the final gear 6, between the final gear 6 and the case supporting wall 52 and fixed by bolts 28 to the case supporting wall 52.

As similar to the case side baffle plate 20, a housing side baffle plate 30 is placed between the final gear 6 and the housing support section 62 and fixed by bolts 38 to the housing support section 62.

The bolts 28 and 38 are screwed from the side of the final gear 6, respectively.

As shown in FIG. 2, the case side baffle plate 20 includes a side face plate 25 covering a side face of the final gear 6, and a tooth face plate 26 extending from a fan-shaped external edge of the side face plate 25 to the side of the final gear 6.

Likewise, the housing side baffle plate 30 includes a side face plate 35 covering a side face of the final gear 6, and a tooth face plate 36 extending from a fan-shaped external edge of the side face plate 35 to the side of the final gear 6.

A tooth surface of the final gear 6 is covered by the tooth face plate 26 of the case side baffle plate 20 and the tooth face plate 36 of the housing side baffle plate 30.

Since the case side baffle plate 20 and the housing side baffle plate 30 surround the final gear 6, as shown in FIG. 2, an oil volume X (oil as a volume) in the circumference of the final gear 6 in which the final gear 6 receives an oil stir resistance during the rotating and an oil volume Y in the sides of the transmission case 50 and the housing 60 (oil as a volume stored in a clearance between the case side baffle plate 20 and the transmission case 50, and in a clearance between the housing side baffle plate 30 and the housing 60) are separated.

Note that rotation of the final gear 6 causes an oil flow in the oil volume X to be produced in the same direction with the rotation of the final gear 6.

As shown in FIG. 1, the case side baffle plate 20 includes a lubricating oil guide 21 formed at an end of an outlet side of the final gear 6 (a side where the rotating final gear 6 goes out the case side baffle plate 20) when the vehicle runs forwards and an oil discharge guide 22 formed at an end of an inlet side of the final gear 6 (a side where the rotating final gear 6 comes into the case side baffle plate 20) when the vehicle runs forwards.

The lubricating oil guide 21 extends to the vicinity of an engagement section between the reduction gear 5 and the final gear 6, thereby acting as a supplying guide so as to supply the oil stirred up by the final gear 6 to the engagement section.

Similarly, the housing side baffle plate 30 includes a lubricating oil guide formed at an end of an outlet side of the final gear 6 when the vehicle runs forwards, thereby to guide the oil stirred up by the final gear 6.

Hence, the oil stirred up by the final gear 6 is supplied to the engagement section between the reduction gear 5 and the final gear 6 as lubricating oil necessary for gear lubrication without dropping downward.

A slit 40 is formed in the oil discharge guide 22 to connect the oil volume X to the oil volume Y.

The oil discharge guide 22 acts as such a guide that the oil in the oil volume X flowing in the same direction with rotation of the final gear 6 is led to the slit 40.

Similarly, the housing side baffle plate 30 includes the lubricating oil guide formed at the end of the inlet side of the final gear 6 when the vehicle runs forwards and a slit 45 is, as specifically shown in FIG. 2, formed in the lubricating oil guide.

The lubricating oil guide of the housing side baffle plate 30 acts as such a guide that the oil of the oil volume X flowing in the same direction with rotation of the final gear 6 is led to the slit 45.

Figure 3:
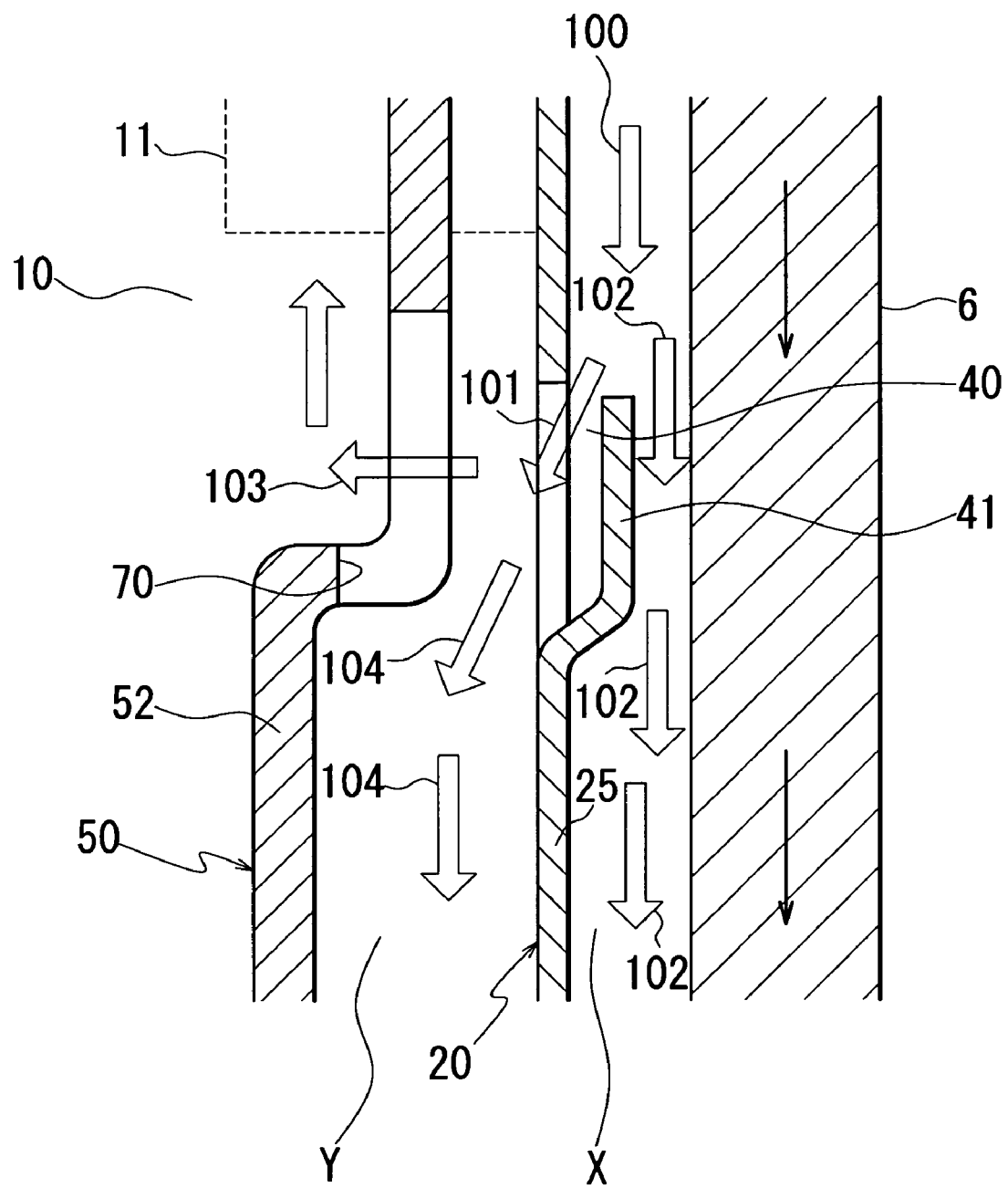
FIG. 3 is a cross-sectional view taken on line A-A in FIG. 1 showing a circumference of a slit formed in a baffle plate in the preferred embodiment.

FIG. 3 is a cross-sectional view taken on line A-A in FIG. 1.

As shown in FIG. 1 and FIG. 3, in the side face plate 25 at a side of the oil discharge guide 22 of the case side baffle plate 20, a cut line of a predetermined length is formed from the connecting section with the tooth face plate 26 toward an inward side of the fan-shaped side face plate 25. And a jetty section 41 is formed by protruding a downstream part of the cut line in relation to an oil flowing direction around the final gear 6, toward a side of the final gear 6, thereby forming the slit 40.

As a result, an opening of the slit 40 faces to an inlet side of the final gear 6 coming into the case side baffle plate 20.

An oil drain hole 70 is formed in the case supporting wall 52 of the transmission case 50 at a position as opposed to the slit 40. The space at the left side of the case supporting wall 52 shown in FIG. 3 is connected to the oil pan 10 mounted to the bottom part of the transmission case 50 (back side in FIG. 3)

An oil flow will be explained with reference to FIG. 3. White space arrows show oil flow directions.

The oil flowing in the oil volume X in the direction of an arrow 100 caused by rotation of the final gear 6 is divided into the oil flowing in the direction of an arrow 101 and the oil flowing in the direction of an arrow 102 by the slit 40.

The oil flowing in the oil volume X in the direction of the arrow 102 serves as a lubricating oil for both the final gear 6 and the reduction gear 5.

The oil flowing in the direction of the arrow 101, namely from the oil volume X to the oil volume Y is a drain oil that does not lubricate the final gear 6 or the reduction gear 5.

The oil flowing in the direction of the arrow 101 is divided into the oil flowing in the direction of arrow 104 into the oil volume Y and the oil flowing in the direction of arrow 103 into the oil drain hole 70.

The oil flowing in the direction of arrow 104 is separated from that flowing in the direction of arrow 102 by the rotation of the final gear 6, and is stored in the oil volume Y.

Since the oil drain hole 70 formed in the case supporting wall 52 is located at a position lower than the oil level "W" of the stored oil in the transmission case 50, the oil stored in the oil volume Y flows from the oil drain hole 70 to the oil pan 10.

The oil flowing in the direction of the arrow 103 is actively supplied to the oil drain hole 70 and then flows to the oil pan 10 in the lower side in FIG. 1 to be collected around the oil strainer 11.

In the housing side baffle plate 30, an oil drain hole communicated with the oil pan 10 is formed at a position as opposed to the slit 45 of a housing support section 62.

The slit 45 as well as the slit 40 actively supply the oil in the oil volume X to the side of the oil drain hole located in the housing support section 62.

According to this embodiment, the final gear 6 corresponds to a rotating body, both the transmission case 50 and the housing 60 correspond to a transmission case. And the oil pan 10 corresponds to an oil reservoir, and each of the slits 40 and 45 corresponds to an oil discharge hole. Further, especially as shown in FIG. 3, the path from the oil drain hole 70 to the oil pan 10 provided in a back side in FIG. 3 corresponds to an oil discharge path.

The preferred embodiment is constructed as described above, whereby both the case side baffle plate 20 and the housing side baffle plate 30 surround the part of the final gear 6 immersed in the oil to divide the space between the final gear 6 and the transmission case 50 into the oil volume X and the oil volume Y, so that the final gear 6 is allowed to stir only the oil in the oil volume X and an amount of the oil to be stirred is reduced. Thereby a friction loss of the final gear 6 can be reduced.

Since the slits 40 and 45 for discharging oil from the oil volume X to the oil volume Y are formed respectively in the side face plates 25 and 35, each facing the side face of the final gear 6, no space for oil flow is needed in a lower part of the transmission case 50. As a result, an automatic transmission in a smaller size in a radial direction of the final gear 6 can be provided as compared to a case where the slits 40 and 45 are formed respectively in the tooth face plates 26 and 36.

Further the slit 40 and the oil drain hole 70 are positioned as opposed to each other and still further the slit 45 and the oil discharge hole provided in the housing support section 62 are positioned as opposed to each other, whereby the oil in the oil volume X can be actively drained through the oil drain hole 70 to the oil pan 10. This prevents an oil shortage in the oil pan 10, and thus. It is avoided that the oil strainer 11 sucks in air.

Both ends of the case side baffle plate 20 and the housing side baffle plate 30 in the outlet side of the final gear 6 are extended to the vicinity of the engagement section between the reduction gear 5 located over final gear 6 and the final gear 6.

This allows flow of the oil stirred up by the final gear 6 to be guided to the engagement section between the reduction gear 5 and the final gear 6 without causing the dropping of the oil, whereby the engagement section of the gears can be lubricated.

Since the slits 40 and 45 each are formed in the vicinity of the ends of the case side baffle plate 20 and the housing side baffle plate 30 at the inlet side of the final gear 6, the oil in the oil volume X to be stirred by the final gear 6 can be discharged to the oil volume Y at earlier timing. This reduces an amount of the oil to be stirred by the final gear 6, thereby allowing a reduction in a friction loss thereof.

Since the jetty section 41 is protruded toward the side of the final gear 6, the slit 40, of which opening is facing the inlet side of the final gear 6, is formed in the case side baffle plate 20. This provides a back flow prevention structure in which the slit 40 prevents reverse flow of the oil from the oil volume Y to the oil volume X.

As this reduces an amount of the oil in the oil volume X by preventing the oil from flowing from the oil volume Y, a reduction in a friction loss of the final gear 6 is achieved.

Note that the slit 45 also forms a back flow prevention structure in the same way with the slit 40 and achieves the same effect as the slit 40.

There are spaces between the baffle plates 20, 30 and the final gear 6 so that the heads of bolts 28, 38 are kept from interfering with the final gear 6. Since the jetty sections forming the slit 40, 45 are disposed in those spaces, increase in a size of the transmission case is prevented.

Figure 4:
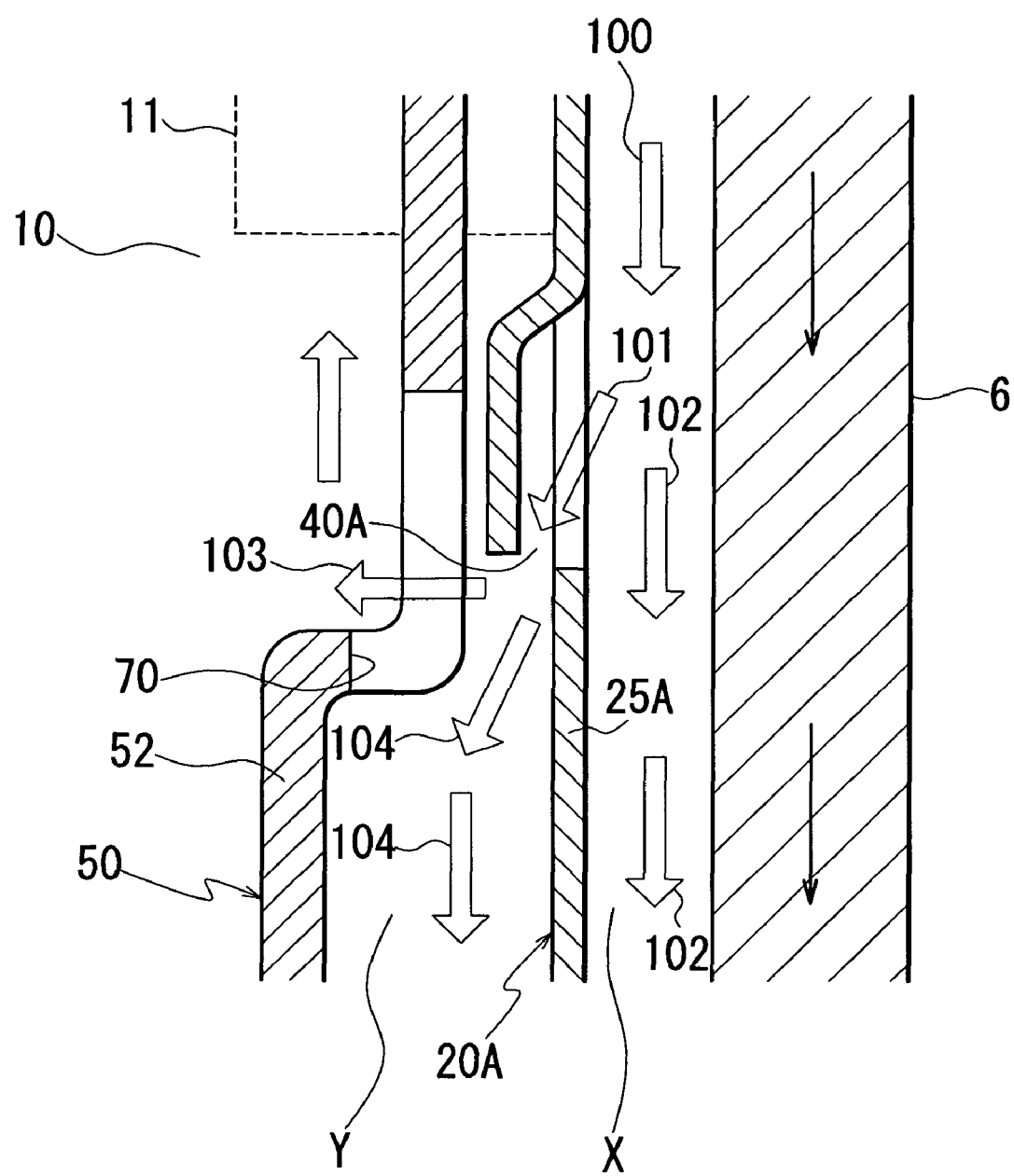
FIG. 4 is a cross-sectional view showing a modification of a slit formed in a baffle plate.

In this embodiment, the jetty section 41 of the case side baffle plate 20 is protruded toward the side of the final gear 6 to form the slit 40, so that the oil around the final gear 6 can be removed by the slit 40. As shown in FIG. 4, however, a slit 40A may be formed by protruding a upstream part of the cut line formed in the side face plate 25A of the case side baffle plate 20A in relation to an oil flowing direction around the final gear 6, backward the side of the final gear 6.

Therefore, an opening of the slit 40A faces the outlet side of the final gear 6 going out from the baffle plate 20A on the case side.

The slit 40A in this case also forms a backflow prevention structure in which reverse flow of the oil from the oil volume Y to the oil volume X can be prevented.

The slit 45 may be formed with its opening facing the outlet side of the final gear 6 going out from the housing side baffle plate 30 in the same way with the slit 40.

The slit 45 is also adapted to form the back flow prevention structure in the same way with the slit 40.

Further, the slit 40 provided in the side face plate 25 of the case side baffle plate 20 and the slit 45 provided in the side face plate 35 of the housing side baffle plate 30 may be holes formed in the side face plates 25 and 35.

In this case too, the oil discharge from the oil volume X to the oil volume Y can be performed.

What is claimed is:

1. An oil discharge structure of a baffle plate, comprising:
    a transmission case that defines a rotating body chamber at least partially filled with oil;
    a first rotating gear;
    a second rotating gear, meshed with the first rotating gear, the second rotating gear having a rotating axis above that of the first gear;
    an oil reservoir provided separately from the rotating body chamber to store oil discharged from the rotating body chamber;
    an oil discharge path from the rotating body chamber to the oil reservoir through an opening provided in a side of the transmission case; and
    a baffle plate placed between the transmission case and the first gear in the rotating body chamber to surround the first gear along a circumferentially whole part which is immersed in the oil so that oil in the circumference of the first gear is divided into a gear side and a transmission case side in the rotating body chamber;
    wherein the baffle plate includes an inlet side end, which is an end of the baffle plate in its circumferential direction where the circumference of the first gear in a rotating state is coming into the space within the battle plate, an outlet side end which is an end of the baffle plate in its circumferential direction where the circumference of the first gear in a rotating state is going out from the space within the baffle plate, and an oil discharge hole formed closer to the inlet side end of the baffle plate than the outlet side end of the baffle plate and facing a side face of the first gear; and
    wherein the oil discharge hole faces the opening in the side of the transmission case, so that the oil in the first gear side divided by the baffle plate is discharged through the oil discharge hole to the oil discharge path.

2. The oil discharge structure of the baffle plate according to claim 1, wherein the outlet side end of the baffle plate surrounds the first gear to an upper part thereof.

3. The oil discharge structure of the baffle plate as defined in claim 1, wherein the oil discharge hole comprises a slit formed with a jetty section at a side of the first gear with an opening thereof facing the inlet side end of the baffle plate, or a slit formed with a jetty section at a side of the transmission case with an opening thereof facing the outlet side end of the baffle plate, the jetty section being configured to provide a back flow prevention structure in which the slit prevents reverse flow of the oil from oil volume of outside the baffle plate to the oil volume within the baffle plate.

4. The oil discharge structure of the baffle plate as defined in claim 1, wherein the baffle plate is fixed to the transmission case by bolts screwed from the side of the first gear; and the oil discharge hole is a slit which is displaced toward the rotating body chamber, so that an opening thereof is facing the inlet side end of the baffle plate.

* * * * *